March 24, 1970 M. DUMAIRE 3,502,793

CRYPTOGRAPHIC DEVICE FOR A CODED BILATERAL COMMUNICATION LINK

Filed Dec. 28, 1966 3 Sheets-Sheet 1

March 24, 1970 M. DUMAIRE 3,502,793

CRYPTOGRAPHIC DEVICE FOR A CODED BILATERAL COMMUNICATION LINK

Filed Dec. 28, 1966 3 Sheets-Sheet 2

United States Patent Office 3,502,793
Patented Mar. 24, 1970

3,502,793

CRYPTOGRAPHIC DEVICE FOR A CODED BILATERAL COMMUNICATION LINK

Marc Dumaire, Paris, France, assignor to CSF-Compagnie Generale de Telegraphie Sans Fil, a corporation of France Filed Dec. 28, 1966, Ser. No. 605,330
Claims priority, application France, Dec. 30, 1965, 44,364
Int. Cl. H04l 9/00, 15/34
U.S. Cl. 178—4 4 Claims

ABSTRACT OF THE DISCLOSURE

A cryptographic device allows, by means of a coding and decoding circuit including a single key-generator, (i) the coding of a message and the transmission of the corresponding clear message in a first synchronous communication channel and (ii) the decoding of a message received from a second synchronous communication channel and the transmission of the corresponding clear message. This result is achieved through the use of memories and of a switching system placing the device in condition for operation on the first or second message, and a logical circuit controlling this switching system for the ensuring that all the conditions required for a safe operation on of the messages are present.

The present invention relates to bilateral secrecy communication.

More particularly the invention relates to a system of this type making it possible to carry out simultaneously in the same station the coding of at least one synchronous communication channel transmitted by this station and the decoding of at least one synchronous communication channel received by this station.

It is an object of the invention to provide a system capable of receiving simultaneously a coded message to be restituted in clear and a clear message by means of a coding and decoding circuit including a single key generator to be restituted as a coded message.

This is achieved through the use of a system of memories, of a switching circuit, and of a logical circuit controlling the latter for ensuring that all the conditions are met for placing the device in condition for operation on one of the messages.

For a better understanding of the invention and to show how the same may be carried into effect reference will be made to the drawing accompanying the following description and in which.

Figure 1:
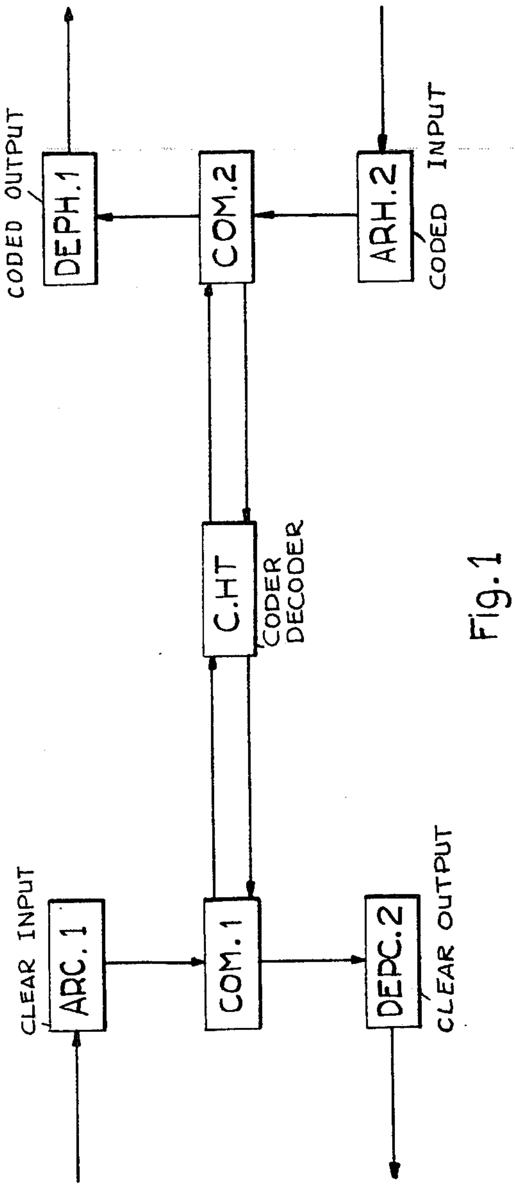
FIG. 1 shows a simplified diagram of the arrangement according to the invention.

In FIG. 1 there is shown a system capable of coding a communication channel 1, for example telegraphic or telephonic, which communication is then transmitted, and of decoding a communication channel 2, received by a receiver. According to the invention, a single coding and decoding device is used for this purpose; the two operations of coding and of decoding are effected alternatively during intervals of time which are very short, compared with the rate of the transmission or reception of the signals.

The system comprises a coding and decoding block CHT, associated with a memory arrangement; this assembly will be described further below.

The communication in channel 1 arrives in clear from local modulation stages to the input stages ARC1; the problem is then to apply this information in coded shape to the output stage DEPH1 connected to the transmission stages and feeding a first communication channel.

Inversely, the communication of channel 2 arrives coded at the input stage ARH2, connected to the reception stages. The problem is then to pass it decoded to the output stage DEPC2, which is connected to the local receiver circuits.

To this end, a first switch COM1 alternately switches stages ARC1 and DEPC 2 to the system CHT, and a switch COM2, alternately, switches thereto the stages ARH2 and DEPH1.

These two switches are switched in synchronization, and the operations are sequential. The two sequences are as follows:

(a) Switches COM1 and COM2 switch stages ARC1 and DEPH1, to system CHT. The channel 1 is coded by the system CHT.

(b) Switches COM1 and COM2 switch stages ARH2 and DEPC2 to system CHT. The channel 2 is decoded by the system CHT.

Figure 2:
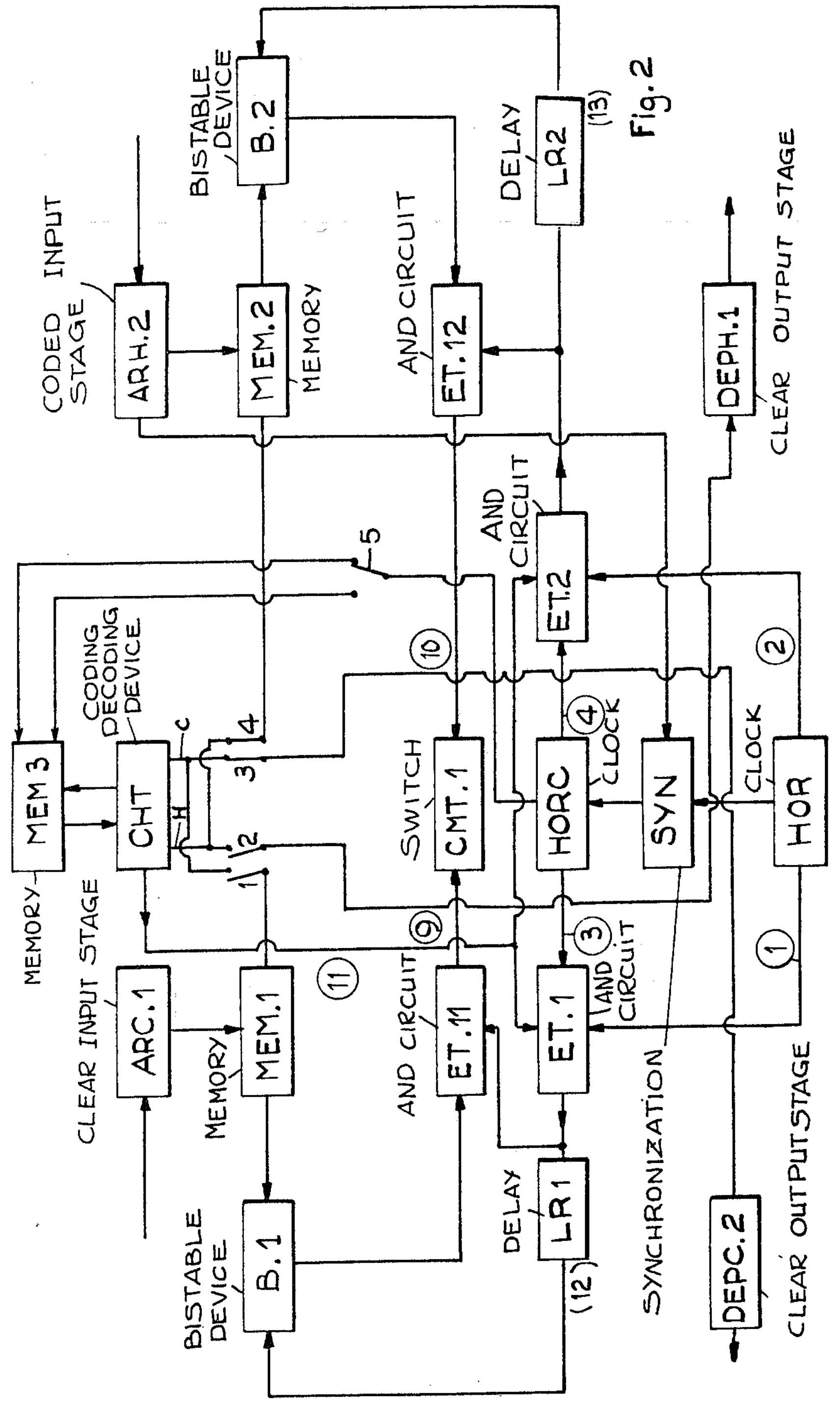
FIG. 2 shows a more detailed block diagram of the arrangement according to the invention.

FIG. 2 shows a more complete diagram of the arrangement.

The coder and decoder CHT is associated with a first memory MEM3.

This memory is arranged for receiving from the coder-decoder CHT an information defining the state of the same, and on the other hand, for transmitting thereto the information stored therein. In this connection, it should be recalled that the key generator contained in the coder consists in general of logic circuits and of counters.

A clock HOR insures the sequential operation of the assembly.

Clock HOR controls a synchronizing device SYN, which controls in turn a controlled clock HORC. This second clock controls by means of the switch CMT1 the exchange of information between the memory MEM3 and the coder CHT.

Two memories MEM1 and MEM2 are connected, respectively to the stages ARC1 and ARH2. These memories are also connected to two multivibrators B1 and B2. Each multivibrator has two states, of which one indicates that the corresponding memory has received an information. The multivibrators B1 and B2 are connected to the clock HORC through two AND-circuit ET1 and ET2.

These circuits have each an output, connected to the corresponding multivibrator through a delay line, LR1 or LR2, which introduces a delay time $\tau$. The three inputs of these AND-circuits are connected, respectively, to the clock HOR, the clock HORC and the coder CHT.

The output of the multivibrator B1 and the output of the AND-circuit ET1 are connected to an AND-circuit ET11, whose output controls a switch CMT1, by means of a first input. This switch comprises a second input controlled by an AND-circuit ET12, connected to the multivibrator B2 and the AND-circuit ET2, in the same way as the AND-circuit ET11 is connected to the multivibrator B1 and the AND-circuit ET1.

The coder-decoder CHT has two reversible terminals C and H. A message applied in clear to the terminal C leaves at H coded, and inversely, a message entering coded at H leaves in clear at C.

The switch CMT1 controls five movable contacts 1 to 5. When it is actuated by its first input, it causes the movable contacts 1 and 2 to engage fixed contacts C and H respectively. When it is actuated by its second input, it causes movable contacts 3 and 4 to engage fixed contacts C and H, respectively.

The movable contact 1 is connected to the memory MEM1, the movable contact 2 to the circuit DEPH1, the movable contact 3 to the circuit DEPC2 and the movable contact 4 to the memory MEM2. The movable contact 5 connects the clock HORC to one of two control inputs of the memory MEM3 and controls the exchange of information between the coder-decoder CHT and the memory MEM3.

The operation of the assembly is as follows:

The transmission is characterized by the fact that the signals, either transmitted in clear (the local side, i.e. from memory MEM1 to circuit CHT); or in code (the transmission side, i.e. through stage DEPH1) occur at predetermined instants. Each signal is transmitted at characteristic instants, the frequency of recurrence of which is fixed. On the other hand, the locally originating signals are received at the clear input stage ARC1 at random instants. The signals received at the coded input stage ARH2 have a fixed average repetition rate, but their instants of arrival may undergo fluctuations due to propagation hazards. In other words, the first communication channel, fed by the output stage DEPH1, and the second communication channel, feeding the input stage ARH2, are synchronous communication channels.

Thus, a complete sequence of signals arriving at the clear terminal stage ARC1 or at the coded terminal stage ARH2 fills the memories MEM1 and MEM2, respectively. When these memories are filled, they trip the multivibrators B1 or B2, respectively, say, into their state 1.

The coding of a sequence of signals can start, when the three following conditions are fulfilled:

(a) The sequence has been received completely;

(b) The coder-decoder CHT must be ready to receive this sequence, that is to say it is not in operation at this moment;

(c) The instant of coding or decoding must be determined by the general synchronization.

It will be shown how the circuit of FIG. 2 makes it possible to carry out these operations.

The clock HOR assures the general synchronization. This clock controls the central clock HORC by means of the synchronization device SYN, which is also connected to the circuit ARH2.

The clock HOR emits two respective sequences of short pulses with the same recurrence frequency at its two outputs (1) and (2); these pulses are phase shifted with respect to each other.

The clock HORC emits two identical signals 3 and 4, which are phase shifted with respect to each other. These pulses are much wider than the pulses (1) and (2) and represent a characteristic instant for the transmitted and received coded signals.

The AND-circuits ET1 and ET2 supply, in response to these signals, and to a signal coming from the coder-decoder CHT and indicating that it is not in operation, pulses 12 and 13, respectively, which pulses interrogate the multivibrators B1 and B2 through AND-gates ET11 and ET12 respectively.

If the multivibrator B1 contains the information that the memory is filled at a time $t$, it is in the state 1. Similarly, if the multivibrator B2 has been so informed at a time $t'$, it is tripped in the state 1. The multivibrators remain in this state until they are interrogated by the circuits ET1 and ET2.

At the arrival of the delayed pulses 12 and 13, they return to the state O whereas the output pulses of the circuits ET11 and ET12 control the switch CMT1. The pulse coming from the AND-circuit ET12 makes the movable contacts 3 and 4 respectively close. From this, it follows that the circuit ARH2–CHT–DEPC2 is closed. The memory MEM2 sends coded cymbols stored therein to the decoding device CHT. They emerges therefrom in clear and are directed towards to terminal DEPC2. The clock HORC causes, via the movable contact 5, the transfer of the state of coder CHT into the memory MEM3 and vice versa, which operation takes place at every movement of the movable contact 5.

The transfer from the coder CHT to memory MEM3 which may be for example of the type including a temporary storage device, as described in the French Patent 1,464,899 and the transfer from memory MEM3 to the coder CHT are effected quasi-simultaneously under the control of the clock HORC.

In the state of the circuits as defined above, the device CHT operates as a decoder.

For the coding of channel 1, the same operations are effected: the movable contacts 1 and 2 are closed, the movable contacts 1 and 2 are closed, the movable contacts 3 and 4 open, the reciprocal transfer CHT MEM3 causes the coder-decoder CHT to operate as a coder.

Figure 3:
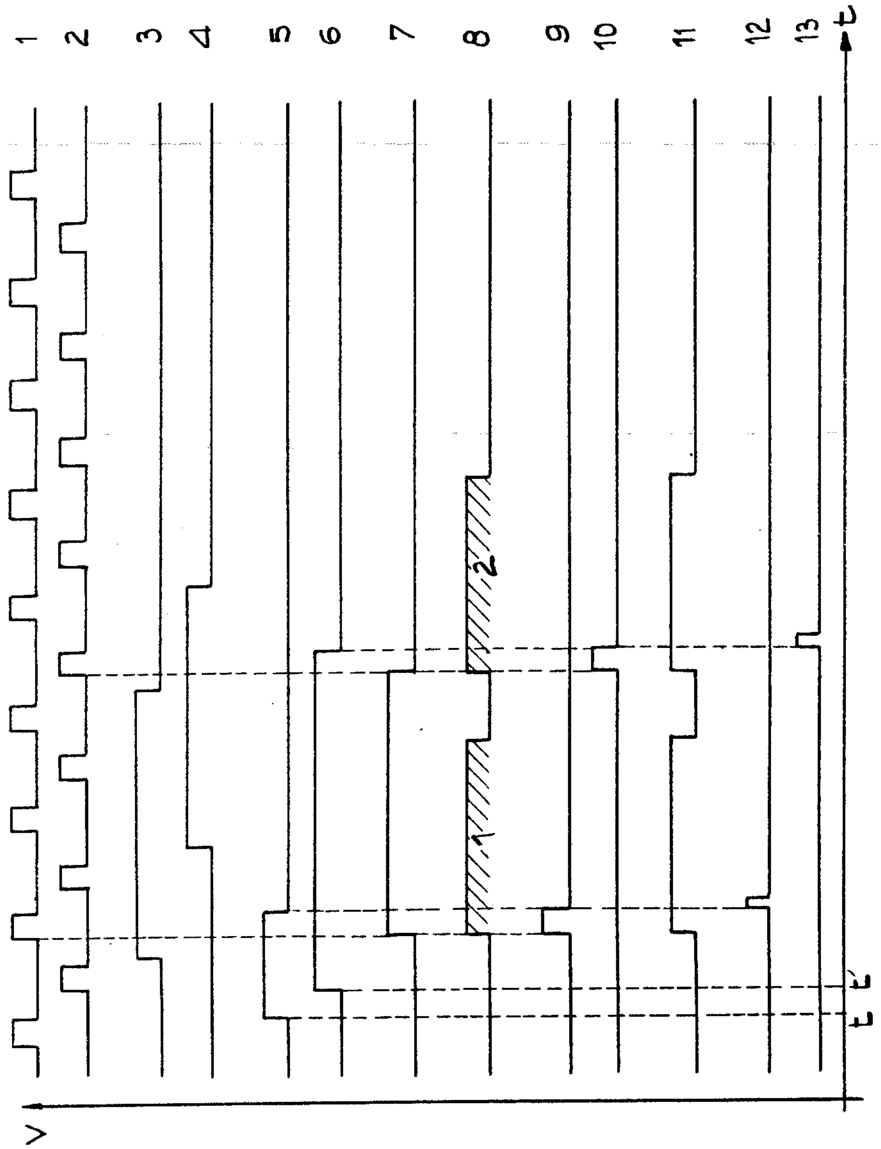
FIG. 3 is an explanatory curve.

FIG. 3 shows the signals appearing at different points of the diagram in FIG. 2.

The signals 1 and 2 appear at the outputs of the clock HOR. These signals are pulses with the same recurrence period, and are phase-shifted with respect to each other.

The signals 3 and 4 represent the aforementioned characteristic instants for the signals which are transmitted or received.

The signals 5 and 6 are the signals indicating the states of the multivibrators B1 and B2. At the time $t$, the multivibrator B1 is in the state 2 (MEM1 filled). At the time $t'$, the multivibrator B2 is in the state 1 (MEM2 filled).

Under the combined action of the pulse 1, the signal 3 and the state of the multivibrator B1, the switch CMT1 switches over and connects the channel 1 until a reversion signal occurs (coincidence of a pulse 2, signal 4 and state 1 of multivibrator B2).

The signal 7 is representative of the state of the switch CMT1.

The signal 8 shows the coding time of the channel 1 and the decoding time of the channel 2 in the coder-decoder CHT.

The dead times correspond to the exchange of information between the memory MEM3 and the coder-decoder CHT.

The signals 9 and 10 are the output signals of the circuits ET11 and ET12, that is to say, the signals switching the switch CMT1.

The signal 11 represents the inhibiting (when at its higher level) signal coming from the coder CHT and applied to the AND-gate ET1 and ET2.

The signals 12 and 13 are the signals which reset the multivibrators B1 and B2 to zero, after a time interval T has elapsed, and control the circuits ET11 and ET12. These are the output signals of the circuits ET1 and ET2.

All the elements of the system described are known as such and, therefore, need not be described in detail.

What is claimed is:

1. Cryptographic device for (i) coding a first message received under the form of electric signals at a first input stage of said device and retransmitting the corresponding coded message in a first synchronous communication channel fed by a first output stage of said device, and (ii) decoding a second message received, under the form of electric signals, from a second synchronous communication channel at a second input stage of said device, and retransmitting the corresponding decoded message to a second output stage of said device, said device comprising:

a coding and decoding assembly comprising: a coding and decoding circuit including a key generator with memory elements and having an auxiliary output for delivering a signal indicating whether this circuit is at rest; and an associated memory system coupled to said coding and decoding circuit for storing information representative of states of said memory elements and restituting said information to said memory elements;

a first clock having a first and a second output for respectively delivering thereto two series of periodic signals having a common frequency but phase-shifted relatively to each other, and a third output; synchronizing means having an input connected to said second input stage, another input connected to said clock third output and an output; a second clock controlled by said last-mentioned output and having first and second outputs for respectively delivering thereto two signals respectively representative of the transmission phase in said first synchronous communication channel and of the reception phase in said second synchronous communication channel;

first and second memories respectively coupled to said first and second input stages for storing a predetermined number of signals of said first and second message respectively;

first and second bistable multivibrators, respectively coupled to said first and second memories, and having respective outputs for delivering thereto first and second further signals upon said first and second memories having been respectively filled;

a switching system having a first state and a second state, for, in said first state thereof, coupling said coding and decoding circuit between said first memory and said first output stage, and in said second state thereof, coupling said coding and decoding circuit between said second memory and said second output stage, and, when passing from anyone of said states into the other, causing the exchange of the information contained in said memory system and in said memory elements of said key generator;

first and second AND-gate means having respective first inputs respectively connected to said first and second multivibrator outputs, respective second inputs respectively connected to said first and second outputs of said first clock, respective third inputs both connected to said auxiliary output of said coding and decoding circuit, respective fourth inputs respectively connected to said first and second outputs of said second clock, and respective outputs for controlling the state of said switching system.

2. A cryptographic device for (i) coding a first messagesage received under the form of electric signals at a first input stage of said device and retransmitting the corresponding coded message in a first communication channel fed by a first output stage of said device, and (ii) decoding a second message received, under the form of electric signals, from a second communication channel at a second input stage of said device, and retransmitting the corresponding decoded message to a second output stage of said device, said device comprising:

a coding and decoding assembly comprising: a coding and decoding circuit including a key generator with memory elements and having an auxiliary output for delivering a signal whether this circuit is at rest; and an associated memory system coupled to said coding and decoding circuit for storing information representative of states of said memory elements and restituting said information to said memory elements;

a timing circuit, having a first, a second and a third output, for respectively delivering on said first and second outputs thereof, a first and a second periodic signal having the same frequency but phase-shifted relatively to each other by a constant phase shift, and for delivering to said third output control signals for said memory system;

first and second memories respectively coupled to said first and second input stages for storing a predetermined number of signals of said first and second message respectively;

first and second means, respectively coupled to said first and second memories, and having respective outputs for delivering thereto first and second further signals upon said first and second memories having been respectively filled;

a switching system having a first state and a second state, for, in said first stage thereof, coupling said coding and decoding circuit between said first memory and said first output stage, and in said second state thereof, coupling said coding and decoding circuit between said second memory and said second output stage, and, when passing from anyone of said states into the other, causing the exchange of the information contained in said memory system and in said memory elements of said key generator;

and a logical circuit coupled to said switching system for controlling the state thereof, said logical circuit having a first, a second, a third, a fourth and a fifth input respectively connected to said first and second outputs of said timing circuit, to said outputs of said first and second means, and to said auxiliary output of said coding and decoding circuit.

3. A cryptographic device as claimed in claim 2, wherein, said first and second communication channels being synchronous channel, said timing circuit has an input coupled to said second input stage, and a fourth and fifth output for delivering thereto signals having a predetermined, phase relationship respectively with the transmission phase in said first synchronous communication channel and the reception phase in said second synchronous communication channel; and said logical circuit has two further inputs respectively coupled to said fourth and fifth outputs of said timing circuit.

4. A cryptographic device as claimed in claim 3, wherein said first and second means comprise a first and a second two-state element having respective first control inputs respectively coupled to said first and second memories for being triggered into their "1" state upon said first and second memories having been respectively filled, respective second control inputs for their resetting to the "0" state, and respective outputs for delivering said first and second further signals, and wherein said logical circuit comprises a first AND-gate having three inputs respectively coupled to said first and fourth outputs of said timing circuit and to said auxiliary output of said coding and decoding circuit, and an output; a second AND-gate having three inputs respectively coupled to said second and fifth outputs of said timing circuit and to said auxiliary output of said coding and decoding circuit; a third AND-gate having two inputs respectively coupled to said output of said first two-state element, and to said output of said first AND-gate, and an output coupled to said switching system and, through a delay line, to said second control input of said first two-state element; and a fourth AND-gate having a first and a second input respectively coupled to said output of said third AND-gate and to said output of said second two-state element, and an output coupled to said switching system and, through a delay line, to said second control input of said second two-state element.

References Cited

UNITED STATES PATENTS

| | | | |
|---|---|---|---|
| 2,582,968 | 1/1952 | Deloraine | 179—15 |
| 2,950,348 | 8/1960 | Mayer | 179—1.5 |
| 2,959,775 | 11/1960 | Marcus | 178—26 |
| 2,969,730 | 1/1961 | Brehm | 178—30 |
| 3,144,515 | 8/1964 | Kaneko | 179—15 |
| 3,249,923 | 5/1966 | Simshauser | 340—347 |

JOHN W. CALDWELL, Primary Examiner

M. M. CURTIS, Assistant Examiner

U.S. Cl. X.R.

178—22, 26